United States Patent
Kolp et al.

[11] Patent Number: 6,165,235
[45] Date of Patent: Dec. 26, 2000

[54] LOW CHLORINE CONTENT COMPOSITIONS FOR USE IN LUBRICANTS AND FUELS

[75] Inventors: Christopher J. Kolp, Richmond Heights, Ohio; Paul A. Lewis, Houston, Tex.; Jeffry G. Dietz, University Heights, Ohio

[73] Assignee: The Lubrizol Corporation, Wickliffe, Ohio

[21] Appl. No.: 08/920,020

[22] Filed: Aug. 26, 1997

[51] Int. Cl.[7] ....................................................... C10L 1/18
[52] U.S. Cl. ........................... 44/331; 508/306; 508/506
[58] Field of Search .............................. 44/331; 508/306, 508/506, 511; 549/255

[56] References Cited

U.S. PATENT DOCUMENTS

| | | | |
|---|---|---|---|
| 3,912,764 | 10/1975 | Palmer | 549/255 |
| 4,234,435 | 11/1980 | Meinhardt et al. | 508/233 |
| 6,077,909 | 6/2000 | Pudelski et al. | 525/285 |

FOREIGN PATENT DOCUMENTS

| | | |
|---|---|---|
| 0 082 601 | 6/1983 | European Pat. Off. . |
| 0 624 602 A1 | 11/1994 | European Pat. Off. . |
| 0 644 208 A2 | 3/1995 | European Pat. Off. . |
| 2312510 | 12/1976 | France . |
| 2354347 | 1/1978 | France . |
| WO94/02572 | 2/1994 | WIPO . |

Primary Examiner—Margaret Medley
Assistant Examiner—Cephia D. Toomer
Attorney, Agent, or Firm—David M. Shold; Teresan W. Gilbert; Michael F. Esposito

[57] ABSTRACT

Polyolefin substituted carboxylic acylating agents having reduced chlorine content of less than 2,000 ppm and a degree of succination of 1.1–2 have been made from polyisobutylene, chlorine and maleic anhydride. The acylating agents are further reacted with amines and/or alcohols to form dispersants having reduced chlorine content.

17 Claims, 2 Drawing Sheets

FIG. 1

FIG. 2

LOW CHLORINE CONTENT COMPOSITIONS FOR USE IN LUBRICANTS AND FUELS

FIELD OF THE INVENTION

This invention relates to compounds for use in lubricants having low halogen content requirement. Examples of the compounds are reaction products of polyolefins with α-β unsaturated acids or anhydrides and derivatives such as dispersants formed therefrom. The reaction products and derivatives therefrom have halogen contents compatible with low halogen requirements. The reaction products and derivatives thereof are made from unique polyolefins having labile halogens as starting materials. The reaction products have a degree of substitution of greater than 1.1 in terms of anhydride groups per polyolefin group.

BACKGROUND OF THE INVENTION

Polyolefin reaction products and derivatives thereof have long been used in the lubricant, fuels, metal working and other industries. Principle reaction products made from polyolefins are polyolefin substituted succinic anhydrides and dispersants made therefrom for use in lubricants and fuels. The literature abounds with examples of various routes used to make these reaction products which are in large part characterized by the halogen promoted reaction of polyolefins such as polyisobutylenes with α-β unsaturated acids or anhydrides such as maleic anhydride to form polyolefin substituted succinic anhydrides. The anhydrides are further reacted with metal salts or with amines having one >NH group or alcohols to form dispersants.

Problems with the current situation for the synthesis of lubricant additives outlined above is that they have a high halogen content which is causing increased environmental concerns for the continued use of the lubricants and fuels containing them.

A heretofore preferred manner of making lubricant additives has been to alkylate α-β unsaturated acids or anhydrides in the presence of chlorine. This type of reaction yields halogen containing polyalkenyl or hydrocarbyl-substituted acids or anhydrides which may be called alkyl substituted carboxylic acylating agents. The substituted carboxylic acylating agents containing halogen can then be further reacted with amines, polyamines, alcohols, amino-alcohols or metal salts to form halogen containing dispersants, esters and metal salts. It is not uncommon for the polyalkenyl-substituted carboxylic acylating agents to have chlorine contents of 0.5–1%. This corresponds to 5,000–10,000 parts per million chlorine.

Examples of U.S. patents which describe methods for preparing hydrocarbyl-substituted aliphatic carboxylic acylating agents, and particularly polyalkenyl-substituted carboxylic acylating agents utilizing various amounts of chlorine include U.S. Pat. Nos. 3,215,707 (Rense); 3,231,587 (Rense); 3,454,607 (LeSuer); 3,912,764; 4,110,349; 4,234,435 (Meinhardt); and 5,041,622 (LeSuer). These patents are incorporated herein by reference in their entirety for disclosure related to the instant invention. U.S. Pat. No. 4,234,435 describes carboxylic derivative compositions produced by reacting at least one substituted succinic acylating agent with a reactant such as amines, alcohols, reactive metals or combinations thereof. The substituted succinic acylating agent consists of polyalkenyl substituent groups and succinic groups. The substituent groups are derived from a polyalkene having an $\overline{M}_n$ value of about 1300 to about 5,000 and an $\overline{M}_w/\overline{M}_n$ value of about 1.5 to about 4. The acylating agents are characterized by the presence within their structure of an average of more than one succinic group for each equivalent weight of substituent groups. Because of the presence of the excess of succinic groups in the acylating agents, such compounds have been referred to in the art as "over succinated," and the products described in the '435 patent have also been characterized as detergents and viscosity improving additives in lubricating oil compositions. When such derivatives are incorporated into lubricating compositions, they impart sufficient fluidity modifying properties to the lubricant which are sufficient to permit elimination of all or a significant amount of viscosity index improver from multi-grade lubricant compositions containing the same.

The acylating agents utilized in preparing the lubricant additives described in U.S. Pat. No. 4,234,435 are prepared by reaction of polyisobutylene polymer with an α-β unsaturated dicarboxylic acid or anhydride such as maleic anhydride in the presence of chlorine. In such instances, the products which are obtained from the reaction and the products obtained from subsequent reaction with amines, alcohols, alcohols and metal compounds contain various amounts of halogen. Due to environmental concerns, it has now become desirable to eliminate or reduce the level of chlorine. One potential solution to eliminating the chlorine contained in such lubricant and fuel additives is simply to not use chlorine in the manufacturing process. Another potential solution is to develop procedures for treating such compositions to remove the chlorine which is present. One procedure for treating various chlorine-containing organic compounds to reduce the level of chlorine therein has been described in a European patent application published under Publication No. 655,242. The procedure described therein for reducing the chlorine content of organochlorine compounds comprises introducing a source of iodine or bromine into the organochlorine compound and contacting the components of the resulting mixture for a sufficient amount of time to reduce the chlorine content without substantially incorporating iodine or bromine into the organochlorine compound. This procedure is successful in reducing the chlorine content of organochlorine compounds, but in some instances, it is desirable to even further reduce the amount of chlorine in additive compositions which are to be utilized in lubricants and fuels.

Another published method of reducing the chlorine content of organo-chlorine compounds is described in U.S. Pat. No. 5,489,390. The method comprises treating the chlorine-containing compound with an acid.

As mentioned above, one technique for reducing the amount of chlorine in additive compositions based on polyalkenyl-substituted carboxylic acylating agents is to prepare such hydrocarbon-substituted dicarboxylic acids in the absence of chlorine, and procedures have been described for preparing such compounds by the "thermal" process in which the polyolefin and the unsaturated dicarboxylic acid are heated together, optionally in the presence of a catalyst. However, when this procedure is used, it is more difficult to incorporate an excess of the succinic groups into the polyalkenyl-substituted succinic acylating agent, and dispersants prepared from such acylating agents do not exhibit sufficient viscosity index improving characteristics.

It has been proposed in the art that ashless dispersants can be prepared with succinic to polyolefin substituent ratios in excess of 1.3:1 by the thermal process when the polyolefin contains a large amount, such as at least about 70%, of the terminal groupings having an alpha-olefinic bond and/or structures capable of isomerizing to such alpha-olefinic structures. Such structures are vinylidene end groups or groups in resonance therewith and are depicted by structures I and II of Table 1. Such procedures are described in published European Patent Application 355 895 and a polymer with high vinylidene content has been available for many years through BASF. Reactive polyisobutylenes having at least 70% of their unsaturation in a terminal position are described in U.S. Pat. Nos. 4,605,808 and 4,152,499. The process described in this patent uses a complex of boron trifluoride and alcohol as catalyst, and a contact time of at least 8 minutes.

Many chlorine-containing methods of forming hydrocarbyl-substituted acylating agents have been described. Patents describing variations on the theme of reacting chlorine with an olefin and maleic anhydride are described in the patents listed above.

One method of preparing succinic acylating agents is conveniently designated as the "two-step procedure" and is described in, for example, U.S. Pat. No. 3,219,666 (Norman et al) which is incorporated herein by reference in its entirety. It involves first chlorinating the polyalkene until there is an average of at least about one chloro group for each molecular weight of polyalkene. (For purposes of this discussion, the molecular weight of the alkene is the weight corresponding to the $\overline{M}_n$ value.) Chlorination involves merely contacting the polyalkene with chlorine gas until the desired amount of chlorine is incorporated into the chlorinated polyalkene. Chlorination is generally carried out at temperatures of about 75° C. to about 125° C. If a diluent is used in the chlorination procedure, it should be one which is not itself readily subject to further chlorination. Poly- and perchlorinated and/or fluorinated alkyl benzenes are examples of suitable diluents.

The second step in the two-step chlorination procedure is to react the chlorinated polyalkene with the maleic reactant at a temperature usually within the range of about 100° C. to about 200° C. The mole ratio of chlorinated polyalkene to maleic reactant is usually about 1:1.

Another procedure for preparing substituted succinic acid acylating agents utilized a process described in U.S. Pat. No. 3,912,764 (Palmer et al) which is expressly incorporate hereby by reference in its entirety.

The polyalkene and the maleic reactant are first reacted by heating them together in a "direct alkylation" procedure. When the direct alkylation step is completed, chlorine is introduced into the reaction mixture to promote reaction of the remaining maleic reactants. According to the patent, 0.3 to 2 or more moles of maleic anhydride are used in the reaction for each mole of olefin polymer; i.e., polyalkene. The direct alkylation step is conducted at temperatures of 180° C. to 250° C. During the chlorine-introducing stage, a temperature of 160° C. to 225° C. is employed. In utilizing this process to prepare the substituted succinic acylating agents useful herein, it would be necessary to use sufficient maleic reactant and chlorine to incorporate at least 1.3 succinic groups into the final product for each equivalent weight of groups derived from the polyalkene.

A further method of preparing a succinic acylating agent is disclosed in U.S. Pat. No. 3,231,587 (Rense) which is herein incorporated specifically by reference. This process, known as the "one step" process, and comprises preparing a mixture of an olefin polymer and maleic anhydride, and contacting said mixture at a temperature above about 140° C. with at least about one mole of chlorine for each mole of maleic anhydride. The product of the above process, as indicated before, is a polyalkenyl-substituted succinic anhydride. The mechanism by which the product is formed is not known. It is known, however, that the process is different from one in which the olefin polymer is first chlorinated and the chlorinated polymer is then allowed to react with maleic anhydride under similar reaction conditions. The two-step process requires a considerably lengthier reaction time and results in products which are much darker in color. Also, if the olefin polymer is to be chlorinated first, the chlorination temperature should not be allowed to exceed 120° C. Higher temperatures are known to cause dechlorination and thus result in products having little or no chlorine.

To carry out the process, it is preferred that the chlorine be introduced into the reaction zone after the olefin polymer has been thoroughly mixed with maleic anhydride. If the chlorine is allowed to come in contact with the olefin polymer prior to the introduction of maleic anhydride, chlorination of the polymer will take place and the advantageous results will not be obtained. The rate of introduction of the chlorine is not critical. Ordinarily, for maximum utilization of the chlorine used, the rate should be about the same as the rate of consumption of chlorine in this reaction.

The minimum temperature at which the reaction of the above process takes place at a reasonable rate is about 100° C.; hence, the minimum temperature at which the process should be carried out is in the neighborhood of about 90° C.–140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in this process requires approximately equimolar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect.

Other procedures for preparing the polyalkenyl-substituted succinic acylating agents also are described in the art and may be used to prepare the carboxylic acylating compositions. For example, U.S. Pat. No. 4,110,439 (Cohen) describes another version of the two-step process, and U.S. Pat. No. 5,041,622 (LeSuer) describes a three-step process. Both of these patents are herein incorporated by references.

SUMMARY OF THE INVENTION

This invention comprises methods for synthesizing polyolefin substituted carboxylic acylating agents having a halogen content of less than 2,000 parts per million (ppm). The acylating agents have a degree of substitution of greater than 1.1.

This invention comprises in part the invention disclosed in co-pending Ser. No. 08/701,937 filed Feb. 13, 1997 and owned by the same assignee as the instant application. Ser. No. 08/701,937 is incorporated herein by reference in its entirety.

DETAILED DESCRIPTION OF THE INVENTION

The current invention is described in outline form below and is illustrated for synthesis of a polyisobutylene-substituted succinic acylating agent having a degree of succination of greater than 1.1 in terms of the succinic to polyisobutylene ratio in the acylating agent.

Step 1. Mix and heat at a temperature of less than 150° C. a conventional polyisobutylene and chlorine and optionally maleic anhydride in the mole ratio of 1:0.1 to 0.9:0.1 to 1.75 (polyisobutylene:chlorine:maleic anhydride).

Step 1A. To the mixture of Step 1 add maleic anhydride if not already added or to supplement the maleic anhydride added in Step 1.

Step 2. Increase the temperature of the mixture and hold at a temperature up to about less than 220° C.

Step 3. Cool the mixture to under about 200° C. and add chlorine and maleic anhydride and in a mole ratio of about 1:1 to 1:1.3.

Step 4. Heat the mixture at a temperature up to about less than 220° C.

Step 5. Optionally blow nitrogen through the mixture of Step 4 until the succinic acylating agent has a chlorine content of less than 2,000 ppm.

In order to produce reaction products having the target chlorine content of about 2,000 ppm or less or in the range of 1,000–2,000 ppm or even less, several critical procedures must be followed in the above outlined procedure. The first critical parameter is to add chlorine to a conventional polyisobutylene in Step 1 only to a maximum amount necessary to chlorinate tetra- and tri-substituted end groups in the conventional polyisobutylene. Normally a conventional polyisobutylene contains roughly about up to 90 mole percent of tetra and trisubstituted end groups and 5 mole percent vinylidene end groups. The end group isomers present in conventional polyisobutylenes are shown in Table 1.

The polyolefin used in this invention are derived from polymerized $C_2$–$C_6$ mono olefins and are called conventional polyolefins as opposed to high vinylidene polyolefins. The polymers may be homopolymers or terpolymers. The preferred polyolefin is polyisobutylene (PIB) formed by polymerizing the $C_4$— raffinate of a cat cracker or ethylene plant butane/butene stream using aluminum chloride or other acid catalyst systems.

The $\overline{M}_n$ range of the polyolefins is from about 300–10,000 or even up to 50,000. However, for instance, the preferred range for polyisobutylenes is $\overline{M}_n$ of about 300–5,000 and the most preferred upper limit $\overline{M}_n$ is in the range of about $\overline{M}_n$ 300–2,500.

TABLE 1

| PIB Terminal Groups | Percent in Conventional PIB | Percent in High Vinylidene PIB |
|---|---|---|
|  I | 4–5% | 50–90% |
|  II | 0–2% | 6–35% |
|  III | 63–67% tri-substituted | 50–90% |
|  IV | 22–28% tetrasubstituted IV and IVa | 1–15% |
| IVA | | |
|  V | 5–8% | 0–4% |
| OTHER | 0–10% | |

The polyolefin made in this manner is termed a conventional polyisobutylene (PBU) and is characterized by having unsaturated end groups shown in Table 1 with estimates of their mole percents based on moles of polyisobutylenes. The structures are as shown in EPO 355 895.

The isomers shown in Table 1 for conventional polyisobutylene and their amounts were determined from $^{13}$C NMR spectra made using a Burker AMX500 or 300 instrument and UXNMRP software to work up the spectra which were determined in $CDCl_3$ at 75.4 or 125.7 MHz. Table 2 gives band assignments for isomers I, III and IV in Table 1. Disappearance of bands III and IV is correlated with halogenation carried out in this invention. The solvent used was $CDCl_3$ and the band assignments are shifts from TMS for spectra recorded in a 300 MHz instrument.

TABLE 2

| Isomer From Table 1 | $^{13}$C NMR BANDS |
|---|---|
| I | 143.5, 114.7 ppm |
| III | 133.7, 122.9 ppm |
| | 134.4, 122.6 ppm |
| IV | 121.5, 133.5 ppm |

In this invention, conventional polyisobutylenes having a total of roughly about 80–90 mole percent tri and tetrasubstituted unsaturated end groups (III and IV in Table 1) are reacted with halogen to form halogenated polyisobutylenes. The amount of halogen used is limited to up to that which is necessary to halogenate the tri and tetrasubstituted end groups. An excess over that amount of halogen will result in overhalogenation of the polyisobutylene and reaction products obtained therefrom will not be useful in compositions requiring low halogen content. Halogenation of the tri and tetrasubstituted end groups results in partially halogenated polyisobutylene. The halogen in the partially halogenated products is labile and is lost in further reaction of the halogenated product with the α-β unsaturated compounds as will be demonstrated below. Specific halogenation of the tri and tetrasubstituted end group is controlled by reaction conditions, the amount of halogen used, solvent and temperature.

Figure 1:
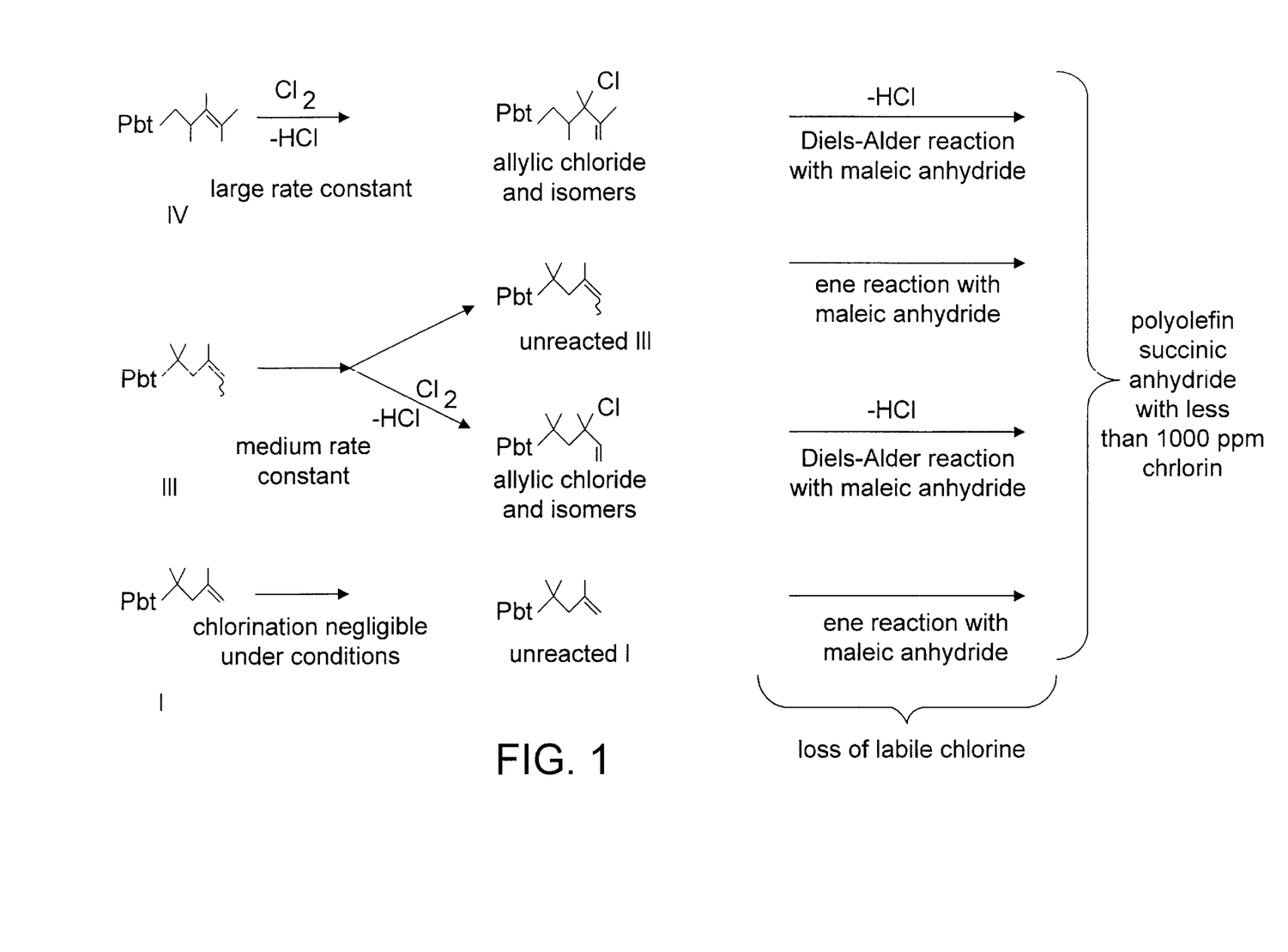

The proposed polyisobutylene partial chlorination reaction sequence for Step 1 of the instant invention is shown in FIG. 1. The allylic compound formed from III and IV and/or isomers derived therefrom is further reacted with maleic anhydride to form an alky- substituted succinic anhydride as shown. Pbt represents the remainder of the polyolefin after reaction.

Under selected reaction conditions, the trisubstituted end group III is halogenated but this has been found to occur at a lower rate constant than tetra halogenation. The vinylidene isomer I is by and large not subject to halogenation under selected reaction conditions. Further, the polyolefin backbone is not chlorinated or is only little chlorinated under reaction conditions selected to halogenate the tetra and trisubstituted end groups. By forming labile allylic halogens in the polyolefin rather than backbone halogens low halogen content products may be made from the partially and selectively halogenated polyolefins. Lack of halogen in the polyolefin backbone is of great importance for the production of low chlorine reaction products since this halogen is difficult to remove and remains with the products. While intractable halogen is identified as being on the polymer backbone, other types of chlorine may be involved.

Idealized chemistry of partial chlorination is depicted in FIG. 1. In the partial chlorination step most of the tetrasubstituted isomer IV can be converted to allylic chlorides. The trisubstituted isomer III is converted at a slower rate and the vinylidene I isomers olefins remain mainly unreacted. In a classical direct alkylation process, the tetrasubstituted olefin end groups react sluggishly, if at all, due to steric inhibition in the ene reaction while the less hindered vinylidene and trisubstituted olefin end groups react at higher rates. However, partially chlorinated polyisobutylene is highly reactive in the direct alkylation process because the allylic chlorides undergo dehydrochlorination to dienes followed by Diels-Alder reaction with maleic anhydride to give Diels-Alder type polyisobutylene succinic anhydrides. As the direct alkylation proceeds, the unreacted trisubstituted and vinylidene olefins isomers I and III are converted to polyisobutylene-substituted succinic anhydrides via ene reactions. Early generation of the Diels-Alder type polyisobutylene-substituted succinic anhydrides, which help solubilize maleic anhydride in the reaction media, might facilitate the later ene reactions. Operation of the two complimentary succination processes affords good conversion to the polyolefin substituted acylating agent. The carboxylic acylating agents or succinic compounds so formed are lower in halogen than any previously isolated in halogen promoted reaction of polyolefins and α-β unsaturated acids. It is a feature of this invention that polyolefin-substituted succinic anhydrides produced in Steps 1–2 of the instant invention have a halogen content of less than 1,000 parts per million and even less than about 200 parts per million.

In addition to the chlorine to polyolefin end groups ratio, the temperature at which the chlorination reaction is conducted is also of great importance. The preferred temperature range for conducting the chlorination of conventional polyolefins is between 50–190° C. However, it is critical in this invention that the chlorination of Step 1 be conducted at a temperature of 150° C. or less, and preferably in the range of about 90° C.–130° C. or 100° C.–120° C. It is even more preferred to conduct the reaction at a temperature from 40° C. to 80° C. if substantially inert solvents such as hexanes are used.

Another important aspect of the polyolefin chlorination reaction is that it can be conducted in the presence of a solvent. Further in this invention, the reaction for the formation of the alkyl-substituted succinic anhydrides may be run as a one-step reaction for the formation of the alkyl-substituted succinic anhydrides with the polyolefin, halogen and α-β unsaturated acid being reacted at the same time. A further aspect of this invention is that the halogen may be diluted with an inert gas. Also, by following this invention less residual polyolefin results than in direct alkylation synthesis of substituted carboxylic acylating agents.

In Step 1 chlorine as described above is added to the polyisobutylene in an amount in moles not exceeding the moles of tetra and tri-substituted end groups in the polyisobutylene. Maleic anhydride as the preferred α-β unsaturated reactant is added to the mixture in Step 1 or Step 1A in the range of 0.75–2.0 moles of anhydride per mole of PBU. The preferred amount is roughly about 1–1.25 moles of maleic anhydride per mole of polyisobutylene.

In Step 2 above the temperature of the mixture is ramped up to a range of about 170° C.–220° C. and the mixture held at temperature until the vinylidene end groups of the polyisobutylene as well as chlorine containing polyisobutylene compounds have reacted with the maleic anhydride to form polyisobutylene substituted succinic anhydride. This step as in Step 1 is critical to this process. As pointed out above, during the chlorination process of Step 1 the tetra and tri-substituted end groups react with chlorine as depicted in FIG. 1 while the vinylidene group is little reacted. The chlorine containing polyolefins then react with maleic anhydride while any non-chlorinated tetra substituted end groups of the polyisobutylene react only slowly at temperatures employed in Step 1. Thus in Step 2 the temperature is increased in the mixture and held for time sufficient for the maleic anhydride to be directly alkylated mostly by the non-chlorinated polyisobutylene vinylidine end groups. The stopping point of choice may be selected for Step 2 on the basis of analyzing for non-polar polyisobutylene species, i.e. those not reacted with maleic anhydride, as described later below.

Figure 2:
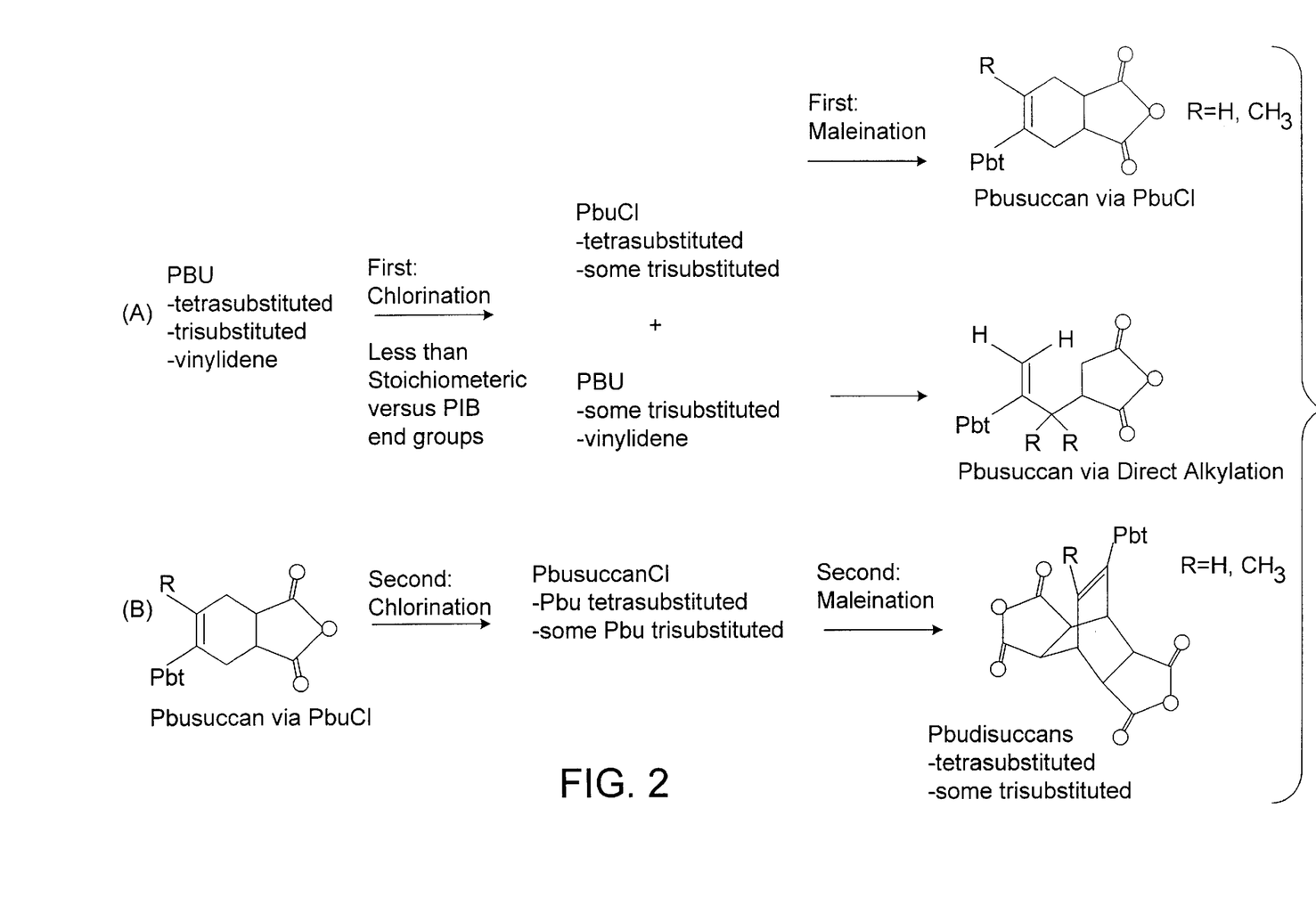

The reactions taking place in Step 2 are illustrated in FIG. 2. FIG. 2A shows a polyisobutylene represented by PBU first being chlorinated in Step 1 with less than a stoichiometric amount of chlorine to yield PbuCl (polyisobutylene containing chlorine) derived from tetra and some tri-substituted end groups. Also present in Step 2A is PBU having vinylidene end groups which have not been chlorinated plus some non-chlorine containing tri-substituted polyisobutylene end groups.

The mixture from Step 1 or Step 1A is then reacted with maleic anhydride in Step 2. The products formed as shown in FIG. 2(A) are a Pbu monosuccan formed from PbuCl and a Pbusuccan formed by direct alkylation of maleic anhydride by PBU with vinylidene end groups. The Pbumonosuccan from PbuCl forms products with tetra and tri-substituted end groups depending if R is $CH_3$ or H respectively. The Pbusuccan formed by direct alkylation is a product having a vinylidene end group. It is critical that the direct alkylation product is formed for two reasons. Firstly if the vinylidine of PBU is not succinated in Step 2 it will be chlorinated leading to increased residual chlorine. Secondly in the next chlorination reaction the Pbusuccan from the direct alkylation will not favorably compete with the Pbusuccan from the PbuCl reaction because of the low reactivity with chlorine of the Pbu olefin of the succan with vinylidene groups. In chlorination steps, care is taken to ensure that the vinylidene end group polyisobutylenes are not chlorinated since chlorine is not removable from such products as it is from tetra and tri-substituted products and will contribute to higher than desired chlorine.

In Step 3 of the method outlined above chlorine and maleic anhydride are added to a reaction mixture cooled below the boiling point of maleic anhydride. The chlorine and maleic anhydride may be added in any sequence or simultaneously. Following addition the mixture is again heated thereby effecting a second chlorination maleination reaction. FIG. 2(B) depicts the reaction of the Pbumonosuccan from the PbuCl route from FIG. 2(A) with chlorine form a Pbumonosuccan Cl which is then maleated to form a Pbudisuccan. In FIGS. 1 and 2 Pbt represents the residual polymer attached to the reaction end group after reaction. The second addition of chlorine is again limited to that necessary to chlorinate tetra and tri-substituted end groups or up to about the same amount of chlorine added in Step 1 above. The maleic anhydride is added in molar amounts roughly equal to or in slight excess of chlorine addition.

During the second maleination the reaction mixture is held at 170° C.–220° C. until the maleic anhydride has reacted to yield the desired Pbu disuccan. The stopping point of the reaction of Step 4 can be selected on the basis of determining unreacted maleic anhydride in the reaction mixture by the method reported below. The unreacted maleic anhydride after completion of the reaction is less than about 3% or more, preferably about 1%–2%.

As shown in FIG. 2(B), chlorination of the PbuCl derived Pbu succans of FIG. 2(A) is probably accomplished upon addition of chlorine because of the high temperature in Step 3. FIG. 2(B) shows the maleination or reaction of maleic anhydride with the PbumonosuccanCl which leads to the desired Pbu disuccan. It must be realized that throughout the reactions discussed above the products are mixtures of identified and unidentified products. FIG. 2 depicts what are major identified products at each stage.

In Step 4 reaction mixture is heated to about the same temperature range as in Step 2 to effect maleination of the PbusuccanCl. This temperature range is up to about less than 220° C. with the preferred temperature range being about 190° C.–210° C.

In a preferred method of this invention for each mole of polyolefin started with in Step 1 and/or Step 1(A), about 0.75 mole of chlorine and about one mole of maleic anhydride is added and the mixture heated at about 195° C.–205° C. to effect chlorination/maleination in Step 2. In Step 3 the same amounts of chlorine and maleic anhydride are added followed by heating in Step 4 to product the Pbudisuccan. While the end product of FIG. 2(B) is described as a Pbudisuccan it must be realized that in this invention a degree of succination of the polyolefin can range from about 1.1–1.75 or even greater.

In descriptions above it is stated that selected end points of maleination reactions can be monitored by analyzing for polyolefin not reacted with maleic anhydride (non-polar polyolefin) and/or for maleic anhydride. Step 2 is conducted until the remaining non-polar polyolefin is about 40% or less of that charged in Step 1. In other words at least 60% of the polyolefin charged has reacted with maleic anhydride. The procedures used are given herein below. The unreacted polyolefin may be determined as a column eluate in the procedure given below. The stopping point of a reaction may also be gauged by the formation of polyisobutylene succinic anhydride or of residual maleic anhydride as outlined in the below procedure.

Determination of Polyisobutylene and Polyisobutylene Succinic Anhydride

This procedure will work on polyisobutylene succinic anhydrides to 2,000 molecular weight. Pure silica gel will not separate molecules larger than 1,000 molecular weight as some of the active ingredient will pass through the column. By the addition of a small amount of super filtrol to the silica gel, much larger molecular weight materials can be quantitatively separated from the free, unreacted polyisobutylene and/or oil.

The apparatus are:

Chromatographic column, 5820-20 from Ace Glass, P.O. Box 688, 1430 N.W. Blvd., Vineland, N.J. 08360. This column is cut in two and the column is flared at the cut to make two columns; each 15 mm I.D.

Adapter, bottom drip, Luer, with flow regulator valve, 15 mm ID 58378-13 to thread on above column, FETFE ring and one polyethylene packing support supplied. Also from Ace Glass Co.

Beakers, 100 mL inverted rim or 200 mL tall form.

Steam bath with source of nitrogen or air to aid evaporation.

Vacuum desiccator operated from Lubrizol Product Development Department.

Chemicals used are:

Silica gel, 60–200 mesh, Grade 62, Davison Chemical Co., Baltimore, Md.

Naphtha, paraffinic hexane and heptane isomers and having a non. vol. residue or less than 10 ppm.

To prepare the column approximately 5 g. of silica gel and about 1 g of super filtrol are poured into the column, sufficient naphtha is added to fill the column contents about 1" from the top. A scrupulously cleaned stainless steel spatula is used to mix the column to rid it of air bubbles. The naphtha layer is allowed to drain through the silica gel until it is about ⅛" above the gel. This naphtha is discarded.

A sample containing about 0.5–0.7 g of polyisobutylene succinic anhydride is placed in a beaker and dissolved in approximately 30 mL of naphtha. This is poured into the column and the naphtha effluent is retained in a tared beaker. After completely draining the column, another 30 mL is added and the effluent is retained in the same beaker. This is repeated until approximately 100 mL is collected in the beaker which is placed on a steam bath and evaporated to completion using air or nitrogen.

The beaker is placed in a vacuum oven at room temperature for ½hour minimum. It is then weighed, the tare weight subtracted and the g of residue is obtained. This residue is the free polyisobutylene and/or oil present in the sample. The polyisobutylene succinic anhydride activity is obtained by subtracting the percent residue from 100.

Calculation:

$$\% \text{ polyisobutylene succinic} = 100 - \left(\frac{\text{wt. residue}}{\text{sample wt. g.}} \times 100\right)$$

$$\% \text{ unreacted polyisobutylene} = \frac{\text{weight of residue}}{\text{weight of starting polyisobutylene}}$$

Unreacted Maleic Anhydride by Extraction

This procedure may be used to determine the water soluble acid content of organic materials. The value is expressed in terms of % maleic acid. The water soluble acids are extracted from a naphtha solution. The extract is titrated with aqueous KOH to a phenolphthalein end point.

The desired sample weight is given in the following table and is dependent upon the amount of anhydride present:

| Expected % Anhydride | Sample Wt., g |
|---|---|
| <1.0 | 10–15 |
| 1.0–1.5 | 7–10 |
| 1.5–2.0 | 5–7 |
| 2.0–3.0 | 3–5 |
| 3.0–4.0 | 2–3 |

Add the sample to a separatory funnel in naphtha. Stopper the flask and shake to dissolve the sample. Use about 100 mL of naphtha in a 250 mL separatory funnel. Heat from a steam bath may be used to facilitate solution.

Add 50 mL of the aqueous alcohol solution to the separatory funnel and shake the funnel vigorously for 2 seconds, vent the funnel then shake the funnel vigorously for an additional 5 seconds. Allow the phases to separate. A steam bath or Tesla coil may be used to facilitate separation. The Tesla coil will give a phase break almost immediately. Drain the lower aqueous phase into an Erlenmeyer flask. Any observed cuff or emulsion must be left in the separatory funnel. Add 50 mL of the aqueous alcohol solution to the separatory funnel. Shake the funnel vigorously for 10 seconds. Allow the phases to separate. A steam bath or Tesla coil may be used to facilitate separation. Combine the lower aqueous phase with the first aqueous extract in the Erlenmeyer flask. Any observed cuff or emulsion must be left in the separatory funnel. Add 5 drops of phenolphthalein indicator to the Erlenmeyer flask. Add an additional 50 mL of the aqueous alcohol solution to the separatory funnel. Shake the funnel vigorously for 10 seconds. Allow the phases to separate. A steam bath or Tesla coil may be used to facilitate separation. While the phases are separating in the steam bath, titrate the combined extracts with 0.1N KOH to the first pink end-point. Repeat steps 15 through 18 until the difference between two successive extract titrations is 0.3 mL or less.

$$\% \text{ Maleic Anhydride} = \frac{\text{mL } KOH \times N KOH \times 4.90}{\text{Sample Weight, g}}$$

Toluene may be added to the naphtha to dissolve the sample. A minimum amount of toluene should be used and in no case should more than 50 mL be used since toluene can retain some of the maleic anhydride.

All water soluble acids will be reported as maleic anhydride by this method. Water soluble acids would include HCl, low molecular weight carboxylic acids and fumaric acid.

If the presence of HCl is suspected, is contribution to the acidity can be determined on the combined extracts in the following manner.

Add 5 drops concentrated $HNO_3$ to the combined extracts. Transfer the solution to a beaker and titrate the acidified extracts with 0.1N $AgNO_3$. calculate the % Cl and the corrected % maleic anhydride as shown below. The sample weight refers to the original sample weight used in the calculation of the extracted acid.

$$\% \text{ Cl} = \frac{\text{mL } AgNO_3 \times N \, AgNO_3 \times 3.55}{\text{Original Sample Weight, g}}$$

$$\% \text{ Anhydride}_{corr} = -\% \text{ Anhydride} - (1.38 \times \% \text{ Cl})$$

Hexanes may be used in place of naphtha. A blank should be run on the solvent, naphtha or hexanes, to assure the solvent is not contributing any extractable acids to the determination.

EXAMPLE 1

Synthesis of polyisobutylene/chlorine reaction products from Steps 1 or 1(A) according to this invention can be taken from our copending application Ser. No. 08/701,937 filed Feb. 13, 1997 which has been incorporated herein by reference in its entirety. These compounds may then be used to complete reaction for this invention.

A complete example for invention using $\overline{M}_n$ 2016 polyisobutylene is given herein below.

In this example the mole amounts of reactants in moles at the various steps of the invention is as follows: polyisobutylene 0.65/chlorine addition 0.49/maleic anhydride addition 0.65/maleic anhydride addition 0.51/chlorine addition 0.51. Based on one mole of polyisobutylene the reactions are in moles 1/0.75/1/0.78/0.78.

For the reaction 1300 grams (0.65 moles) of polyisobutylene is heated to 110° C. and 35 grams (0.49 moles) of chlorine gas added over 8 hours while maintaining the temperature at 110° C.

The mixture is then heated to 149° C. and 64 grams (0.65 mole) maleic anhydride is added over 1 hour. The mixture is heated to 210° C. over 7 hours and held at 210° C. for 4 hours. The mixture is then cooled to 182° C. and 50 grams (0.51 mole) maleic anhydride added over 15 minutes. To the mixture was then added over 8 hours 36 grams (0.51 mole) of chlorine while maintaining the temperature at 182° C. The mixture is then heated to 199° C. over 2 hours and held for 3 hours at temperature. The temperature is then increased to 210° C. and held for two hours at temperature while the mixture is blown with nitrogen at 0.1 standard cubic feet per hour. The reaction product had a residual chlorine of 1306 ppm, 11.5% unreacted polyisobutylene and 0.64% residual maleic anhydride. The degree of substitution of maleic on the $\overline{M}_n$ 2,000 polyisobutylene is about 1.5, or in other words there are 1.5 units of maleic anhydride per unit of polyisobutylene. TAN=77.5. The conversion values in the examples are based on total polyisobutylene charged and no adjustment for residual maleic anhydride.

EXAMPLE 2

A further example of the reaction of the instant invention was to form a polyisobutylene chlorine (PbuCl) using 1 mole of polyisobutylene $\overline{M}_n$ 2136 and 0.91 mole chlorine in hexane at 70-75° C. and hexane removed following chlorination. This PbuCl 500 grams (0.2205 mole) and 32 grams maleic anhydride (0.3265 mole) under nitrogen purge at 0.1 SCFH were heated from 150° C.–190° C. over 1 hour. The mixture was held at 190° C. for 7 hours and allowed to cool to about 150° C. and 15.5 grams (0.158 mole) maleic anhydride added. The nitrogen gas was stropped and 12.5 grams (0.175 mole) chlorine blown into the mixture over two hours. Nitrogen blowing was reinitiated at 0.1 SCFH and the temperature ramped from 150° C. to 190° C. and held 7 hours. The mixture was then heated at 220° C. for 4 hours. TAN=77.0. The resulting product had a degree of succination 1.57 and residual chlorine value of 1603 ppm.

The reaction products obtained in this invention, that is Pbusuccans and Pbudisuccans also called polyisobutylene substituted carboxylic acylating agents are subject to further reactions with specified reactants to form further reaction products such as dispersants. The reactant is selected from the group consisting of (a) amine characterized by the presence within its structure of at least one H—N< group, (b) alcohol, (c) reactive metal or reactive metal compound, (d) a combination of two or more of any (a) through (c), the components of (d) being reacted with said substituted acylating agent either sequentially or simultaneously in any order. Ammonia and hydrazine are included in the above reactant groups. For a full disclosure of reactions of substituted acylating agents with (a)–(d) above we incorporated herein by reference U.S. Pat. No. 4,234,435. An example of (a) amines are monoamines having a H—N< group and generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary monoamines will not result in formation of an amide, but can form salts with carboxylic acids.

In another embodiment, the monoamine may be a hydroxyamine. Typically, the hydroxyamines are primary or secondary amines or mixtures thereof. As stated above, tertiary monoamines will not react to form amides; however tertiary alkanol monoamines sometimes can react to form a tertiary amino group containing ester. Hydroxy amines that can react to form amide can be represented, for example, by the formulae:

wherein each R" is independently a hydrocarbyl group, preferably alkyl or alkenyl, of one to about 22 carbon atoms or a hydroxyhydrocarbyl group, preferably aliphatic, of two to about 22 carbon atoms, preferably one to about four, and R' is a divalent hydrocarbyl group, preferably an alkylene group, of about two to about 18 carbon atoms, preferably two to about four. Typically, each R" is independently a methyl, ethyl, propyl, butyl, pentyl or hexyl group. The group —R'—OH in such formulae represents the hydroxyhydrocarbyl group. R' can be acyclic, alicyclic or aromatic. Typically, R' is an acyclic straight or branched alkylene group such as an ethylene, 1,2-propylene, 1,2-butylene, 1,2-octadecylene, etc.

Examples of these alkanolamines include mono- and diethanolamine, 2-(ethylamino)ethanol, 2-(butylamino) ethanol, etc.

Hydroxylamine ($H_2N$—OH) is a useful condensable monoamine.

The hydroxyamines can also be ether-containing N-(hydroxyhydro-carbyl) amines. These are hydroxy poly (hydrocarbyloxy) analogs of the above-described hydroxy amines (these analogs also include hydroxyl-substituted oxyalkylene analogs). Such N-(hydroxyhydrocarbyl) amines can be conveniently prepared, for example, by reaction of epoxides with aforedescribed amines and can be represented by the formulae:

wherein x is a number from about 2 to about 15 and $R_4$ and R' are as described above. R" may also be a hydroxypoly (hydrocarbyloxy) group.

Other useful amines include ether amines of the general formula

$R^a OR'NHR^b$ wherein $R^a$ is a hydrocarbyl group, preferably an aliphatic group, more preferably an alkyl group, containing from 1 to about 24 carbon atoms, R' is a divalent hydrocarbyl group, preferably an alkylene group, containing from two to about 18 carbon atoms, more preferably two to about 4 carbon atoms and $R^b$ is H or hydrocarbyl, preferably H or aliphatic, more preferably H or alkyl, more preferably H. When $R^b$ is not H, then it preferably is alkyl containing from one to about 24 carbon atoms. Examples of ether amines include, but are not limited to, hexyloxypropylamine, dodecyloxypropylamine, octyloxypropylamine, and N-decyloxypropyl-1,3-diamino propane. Ether amines are available from Tomah Products, Inc. and under the name SURFAM produced and marketed by Sea Land Chemical Co., Westlake, Ohio.

The amine may be an amino heterocycle. Examples include aminopyridine, aminopropylimidazole, aminopyrimidine, aminomercaptothiadiazoles, and aminotriazole.

The amine may also be a polyamine. The polyamine contains at least two basic nitrogen atoms and is characterized by the presence within its structure of at least one HN< group. Mixtures of two or more amino compounds can be used in the reaction. Preferably, the polyamine contains at least one primary amino group (i.e., —$NH_2$) and more preferably is a polyamine containing at least two condensable —NH— groups, either or both of which are primary or secondary amine groups. The polyamine may be aliphatic, cycloaliphatic, heterocyclic or aromatic. Examples of the polyamines include alkylene polyamines, hydroxy containing polyamines, arylpolyamines, and heterocyclic polyamines.

Among the preferred polyamines are the alkylene polyamines, including the polyalkylene polyamines. The alkylene polyamines include those conforming to the formula wherein n is from 1 to about 10; preferably about 2 to about 7, more preferably about 2 to about 5, each U is independently hydrocarbylene, preferably alkylene having from 1 to about 10 carbon atoms, often from about 2 to about 6, more preferably from about 2 to about 4 carbon atoms, each $R^c$ is independently a hydrogen atom, a hydrocarbyl group, preferably aliphatic, or a hydroxy-substituted or amine-substituted hydrocarbyl group, preferably aliphatic, having up to about 30 atoms, or two $R^c$ groups on different nitrogen atoms can be joined together to form a U group, with the proviso that at least one $R^c$ group is hydrogen. Preferably U is ethylene or propylene. Especially preferred are the alkylene polyamines where each RC is hydrogen, lower alkyl, or an amino-substituted hydrocarbyl group, preferably aliphatic, with the ethylene polyamines and mixtures of ethylene polyamines being the most preferred.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, trimethylene diamine, tripropylene tetramine, tetraethylene pentamine, hexaethylene heptamine, pentaethylenehexamine, aminoethyl piperazine, dimethyl aminopropylamine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading "Diamines and Higher Amines" in Kirk Othmer's "Encyclopedia of Chemical Technology", 4th Edition, Vol. 8, pages 74–108, John Wiley and Sons, N.Y. (1993) and in Meinhardt, et al, U.S. Pat. No. 4,234,435, both of which are hereby incorporated herein by reference for disclosure of useful polyamines. Such polyamines are conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. The mixtures are particularly useful. On the other hand, quite satisfactory products can be obtained by the use of pure alkylene polyamines. Ethylene polyamine mixtures are useful.

Other useful types of polyamine mixtures are those resulting from stripping of the above-described polyamine mixtures removing lower molecular weight polyamines and volatile components to leave as residue what is often termed "polyamine bottoms". In general, alkylene polyamine bottoms can be characterized as having less than 2%, usually less than 1% (by weight) material boiling below about 200° C. In the instance of ethylene polyamine bottoms, which are readily available and found to be quite useful, the bottoms contain less than about 2% (by weight) total diethylene triamine (DETA) or triethylene tetramine (TETA). A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 centistokes. Gas chromatography analysis of such a sample showed it contains about 0.93% "Light Ends" (most probably diethylenetriamine), 0.72% triethylenetetramine, 21.74% tetraethylene pentamine and 76.61% pentaethylene hexamine and higher (by weight). These alkylene polyamine bottoms include cyclic condensation products such as piperazine and higher analogs of diethylene triamine, triethylenetetramine and the like.

In another embodiment, the polyamines are hydroxy-containing polyamines provided that the polyamine contains at least one condensable —N—H group. Hydroxy-containing polyamine analogs of hydroxy monoamines, particularly alkoxylated alkylenepolyamines can also be used. Typically, the hydroxyamines are primary or secondary alkanol amines or mixtures thereof. Such amines can be represented by mono- and poly-N-hydroxyalkyl substituted alkylene polyamines wherein the alkylene polyamines are as described hereinabove; especially those that contain two to three carbon atoms in the alkylene radicals and the alkylene polyamine contains up to seven amino groups. Such polyamines can be made by reacting the above-described alkylene amines with one or more of the above-described alkylene oxides. Similar alkylene oxide-alkanolamine reaction products can also be used such as the products made by reacting the aforedescribed primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylene-pentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

The polyamines may be polyoxyalkylene polyamines, including polyoxyethylene and polyoxypropylene diamines and the polyoxypropylene triamines having average molecular weights ranging from about 200 to about 2,000. Polyoxyalkylene polyamines are commercially available, for example under the tradename "Jeffamines" from Texaco Chemical Co. U.S. Pat. Nos. 3,804,763 and 3.948,800 contain disclosures of polyoxyalkylene polyamines and are incorporated herein by reference for their disclosure of such materials.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkylmorpholines, N-aminoalkylthiomorpholines, N-aminoalkylpiperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6- membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkyl substituted piperidines, piperazine, aminoalkyl substituted piperazines, morpholine, aminoalkyl substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethyl-piperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly (ethylene/propylene)amine, (50:50 mole ratio of monomers); poly-isobutylene amine; N,N-di(hydroxyethyl)-N-polyisobutylene amine; N-(2-hydroxy-propyl)-N-polyisobutylene amine; N-polyisobutylene-aniline; N-polyisobutylene-morpholine; N-poly(butene) ethylenediamine; N-poly(propylene)tri-methylenediamine; N-poly(butene)diethylene-triamine; N',N'-poly(butene)-tetraethylenepentamine; N,N-dimethyl-N'-poly-(propylene)-1,3-propylene-diamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by an n (number average molecular weight) value of at least about 500. Generally, the polyalkene substituted amine is characterized by an n value of about 500 to about 5,000, preferably about 800 to about 2500. In another embodiment n varies between about 500 to about 1200 or 1300.

The polyalkenes from which the polyalkene substituted amines are derived include homopolymers and interpolymers of polymerizable olefin monomers of 2 to about 16 carbon atoms; usually 2 to about 6, preferably 2 to about 4, more preferably 4. The olefins may be monoolefins such as ethylene, propylene, 1-butene, isobutene, and 1-octene; or a polyolefinic monomer, preferably diolefinic monomer, such as 1,3-butadiene and isoprene. Preferably, the polymer is a homopolymer. An example of a preferred homopolymer is a polyisobutylene, preferably a polyisobutylene in which about 50% of the polymer is derived from isobutylene. The polyalkenes are prepared by conventional procedures.

Another useful polyamine is a condensation product obtained by reaction of at least one hydroxy compound with at least one polyamine reactant containing at least one primary or secondary amino group. These condensation products are characterized as being a polyamine product having at least one condensable primary or secondary amino group, made by contacting at least one hydroxy-containing material (b-i) having the general formula $$(R)_n Y_z - X_p - (A(OH)_q)_m \quad (I)$$

wherein each R is independently H or a hydrocarbon based group, Y is selected from the group consisting of O, N, and S, X is a polyvalent hydrocarbon based group, A is a polyvalent hydrocarbon based group, n is 1 or 2, z is 0 or 1, p is 0 or 1, q ranges from 1 to about 10, and m is a number ranging from 1 to about 10; with (b-ii) at least one amine having at least one N—H group.

The hydroxy material (b-i) can be any hydroxy material that will condense with the amine reactants (b-ii). These hydroxy materials can be aliphatic, cycloaliphatic, or aromatic; monools and polyols. Aliphatic compounds are preferred, and polyols are especially preferred. Highly preferred are amino alcohols, especially those containing more than one hydroxyl group. Typically, the hydroxy-containing material (b-i) contains from 1 to about 10 hydroxy groups.

Monools useful as (b-i) are primary or secondary, preferably alkyl, monohydric compounds, preferably containing from 1 to about 100 carbon atoms, more preferably up to about 28 carbon atoms. Examples include methanol, ethanol, butanols, cyclohexanol, 2-methylcyclohexanol, isomeric octanols and decanols, octadecanol, behenyl alcohol, neopentyl alcohol, benzyl alcohol, beta-phenylethyl alcohol, and chloroalkanols.

Further examples are monoether- and polyether-containing monools derived from oxyalkylation of alcohols, carboxylic acids, amides, or phenolic materials, by reaction with alkylene oxides. When two or more different alkylene oxides are employed, they may be used as mixtures or consecutively, as discussed in greater detail hereinbelow. These ether-containing monools can be represented by the general structure:

wherein R=hydrocarbyl, acyl, or carboxamidoalkyl; preferably containing from 1 to about 28 carbon atoms, each of $R^d$, $R^e$ and $R^f$ is hydrocarbylene containing from 2 to about 12 carbon atoms, more often 2 or 3 carbon atoms; a, b, and c=0–100, provided that the total of a, b, and c is at least 1. When R is hydrocarbyl, it may be alkyl-, aryl-, arylalkyl-, or alkylaryl-. In one embodiment, a and b may from zero to about 12, preferably from zero to about 6, while in another embodiment, a and b range up to about 100.

Examples include 2-alkoxyethanols, members of the "Cellosolve" family of glycol ethers made by Union Carbide Corporation, and 2-(polyalkoxy)ethanol. Other commercially available products of alcohol alkoxylation include Neodol® ethoxylated linear and branched alcohols from Shell Chemical, Alfonic® ethoxylated linear alcohols from Vista Chemical, propoxylated alcohols from ARCO Chemicals, UCON® propoxylated alcohols from Union Carbide, Provol® propoxylated fatty alcohols from Croda Chemical, and Carbowax methoxy polyethylene glycols, such as Carbowax® 350 and 750 from Union Carbide.

Aryl analogs of lower ether-containing monools include, for example, 2-(nonylphenoxyethyloxy)ethanol, 2-(octylphenoxyethyl-oxyethyloxy)ethanol and higher homologs made using greater amounts of alkylene oxides, marketed under the TRITON® trademark by Union Carbide.

As noted hereinabove, polyether monools may also be prepared by condensation of 2 or more different alkylene oxides, in mixtures or consecutively, with alcohols, alkylphenols or amides. Commercially available polyether monools made from reaction of mixtures of ethylene oxide and propylene oxide with butanol are represented by the UCON® 50-HB- and 75-HB-series of functional fluids from Union Carbide, while similar products from mixtures of propylene oxide and higher (e.g., $C_4$–$C_{10}$) alkylene oxides are sold by BP Chemicals under the Breox® tradename.

Polyols are defined herein as compounds containing at least two hydroxy groups.

Dihydroxy compounds include alkylene glycols of general structure HO—(—R—)—OH, wherein R is hydrocarbylene. Examples are ethylene glycol, 1,2-propanediol, 1,2-, 1,3- and 1,4-butylenediols, 1,6-hexanediol, neopentylene glycol, 1,10-decanediol, cyclohexane-1,4-diol and 1,4-bis-(hydroxymethyl) cyclohexane.

Other diols include ether-diols and polyether diols (glycols). These may be represented by the general structure:

wherein $R^d$, $R^e$ and $R^f$ are independently $C_2$–$C_{12}$ hydrocarbylene, more often ethylene or propylene, and a, b and c are independently zero to about 100, provided that the total of a, b, and c is at least 1. Examples of ether- and polyether- diols are diethylene glycol, triethylene glycol, tetraethylene glycol, dipropylene glycol, 2-(2-hydroxyethyloxy)-1-propanol and 1,2-bis-(2-hydroxypropyloxy)ethane, polyoxy-alkylene oxides of the Carbowax® family of polyethylene glycols from Union Carbide, the Pluronic® P-series of polypropylene oxide diols from BASF, polyoxybutylene glycols from Dow Chemical, and the like.

In addition to monools and diols, other useful alcohols include polyhydric alcohols having three or more HO— groups, preferably those containing up to about 12 carbon atoms, and especially those containing from about 3 to about 10 carbon atoms. Useful polyhydric polyols include, glycerol, trimethylol propane, 2-ethyl-2-hydroxymethyl-1,3-propanediol, erythritol, pentaerythritol, dipentaerythritol, glucose, arabinose, 1,2,3-hexane triol, 2,3,4-hexanetriol, butanetriols, and polyglycerols (including the ether-coupled glycerol dimer, trimer, tetramer, etc.)

Amino alcohols are useful hydroxy containing compounds. Amino alcohols may be aliphatic, cycloaliphatic or aromatic, containing at least one hydroxy group and preferably containing two or more hydroxy groups. These may be prepared by methods known in the art, for example, by reaction of an amine having at least one N—H group with an alkylene oxide. Another procedure is to condense an aldehyde, particularly formaldehyde, with a nitro compound followed by reduction of nitro groups.

Useful amino alcohols include monoamino and polyamino compounds. These may be monohydroxy or polyhydroxy compounds, depending, for example on the extent of reaction with alkylene oxide. For example, a primary amine may react with one or two alkylene oxides, forming mono- or di- hydroxyalkylamines. Polyalkoxy ether containing amino alcohols are also useful. These may be prepared by reaction of ammonia or a primary or secondary amine with an excess of alkylene oxide.

Some of the more useful amino alcohols are the reduced condensation products of formaldehyde with nitroalkanes. Particularly useful are 2-amino-2-(2-hydroxymethyl)-1,3-propane-diol (commonly known as "THAM", or "TrisAmino"), 2-amino-2-ethyl-1,3-propanediol, and 2-amino-2-methyl-1,3-propanediol.

Examples of other useful amino alcohols include N-(N)-hydroxy-lower alkyl) amines and polyamines such as di-(2-hydroxyethyl) amine, aminoethanol, triethanolamine, dibutylaminoethanol, tris(hydroxypropyl)-amine, N,N,N',N'-tetra-(hydroxyethyl)trimethylene-diamine, and the like.

Examples of commercially available oxyalkylated amines include members of the Ethomeen® and Propomeen® series of ethoxylated and propoxylated primary and secondary amines from AKZO Chemie. Ethylene diamine/propylene oxide products constitute the Tetronic® family of polyoxyalkylated diamine available from BASF/Wyandotte Corporation.

Reaction of ethylene oxide or propylene oxide with polyglycolamine from Union Carbide gives the corresponding di-(2-hydroxyalkyl)-ether amine. Similar reaction of these alkylene oxides with Jeffamine® polyoxypropylamines from Huntsman Chemical results in the formation of N-hydroxyalkylated derivatives. Corresponding products may be made by hydroxyalkylation of 3-(higher alkyloxy) propylamines.

Other useful hydroxy-containing reactants are hydroxyalkyl-, hydroxyalkyl oxyalkyl-, and corresponding aryl derivatives thereof, sulfides of the formula wherein R is a hydrocarbyl or hydroxyhydrocarbyl group containing from 1 to about 22 carbon atoms, R is a hydrocarbylene group containing 2 to 12 carbons, a is 1 or 2; and b ranges from 1 to about 20. Examples include 2-(dodecylthio)ethanol, thiodiethanol, and 2-hydroxyethyl disulfide.

The hydroxy compounds are preferably polyhydric alcohols and amines, preferably polyhydric amines. Polyhydric amines include any of the above-described monoamines reacted with an alkylene oxide (e.g., ethylene oxide, propylene oxide, butylene oxide, etc.) having two to about 20 carbon atoms, preferably 2 to about 4. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Among the preferred amines making up b(ii) are the alkylene polyamines, including the polyalkylene polyamines. In another embodiment, the polyamine may be a hydroxyamine provided that the polyamine contains at least one condensable —N—H group.

Preferred polyamine reactants include triethylenetetramine (TETA), tetraethylenepentamine (TEPA), pentaethylenehexamine (PEHA), and mixtures of polyamines such as the above-described "amine bottoms".

Preferred combinations of reactants for making the polyamine product include those in which reactant (b-i) is a polyhydric alcohol having three hydroxyl groups or an amino alcohol having two or more hydroxy groups and reactant (b-ii) is an alkylene polyamine having at least two primary nitrogen atoms and wherein the alkylene group contains 2 to about 10 carbon atoms.

The reaction is conducted in the presence of an acid catalyst at an elevated temperature. Catalysts useful for the purpose of this invention include mineral acids (mono, di- and poly basic acids) such as sulfuric acid and phosphoric acid; organophosphorus acids and organo sulfonic acids, alkali and alkaline earth partial salts of $H_3PO_4$ and $H_2SO_4$, such as $NaHSO_4$, $LiHSO_4$, $KHSO_4$, $NaH_2PO_4$, $LiH_2PO_4$ and $KH_2PO_4$; $CaHPO_4$, $CaSO_4$ and $MgHPO_4$; also $Al_2O_3$ and Zeolites. Phosphorus and phosphoric acids and their esters or partial esters are preferred because of their commercial availability and ease of handling. Also useful as catalysts are materials which generate acids when treated in the reaction mixture, e.g., triphenylphosphite. Catalysts are subsequently neutralized with a metal-containing basic material such as alkali metal, especially sodium, hydroxides.

The reaction to form the polyamine products is run at an elevated temperature which can range from 60° C. to about 265° C. Most reactions, however, are run in the 220° C. to about 250° C. range. The reaction may be run at atmospheric pressure or optionally at a reduced pressure. The degree of condensation of the resultant high molecular weight polyamine prepared by the process is limited only to the extent to prevent the formation of solid products under reaction conditions. The control of the degree of condensation of the product of the present invention is normally accomplished by limiting the amount of the condensing agent, i.e., the hydroxyalkyl or hydroxy aryl reactant charged to the reaction. The resulting product frequently contains the neutralized catalyst and significant amounts by weight, from about 0.1%, often at least 1%, frequently 5% up to 20%, often up to 10%, water.

The amine condensates and methods of making the same are described in Steckel (U.S. Pat. No. 5,053,152) which is incorporated by reference for its disclosure to the condensates and methods of making.

Further reaction products between the carboxylic acylating agents and (a) through (d) above may be post-treated by contacting the compositions of (E) thus formed with one or more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thio-urea, guanidine, dicyanodiamide, hydrocarbyl phosphates, hydrocarbyl phosphites, hydrocarbyl thiophosphites, phosphorus oxides, phosphoric acid, hydrocarbyl thiocyanates, hydrocarbyl isocanates, hydrocarbyl isothiocyanates, epoxides, episulfides, formaldehyde or formaldehyde-producing compounds plus phenols, and sulfur plus phenols. The same post-treating reagents are used with carboxylic derivative compositions prepared from the acylating reagents of this invention and a combination of amines and alcohols as described above. However, when the carboxylic derivative compositions of this invention are derived from alcohols and the acylating reagents, that is, when they are acidic or neutral esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, carboxylic acid acylating agents, epoxides, and episulfides.

Since post-treating processes involving the use of these post-treating reagents is known insofar as application to reaction products of high molecular weight carboxylic acid acylating agents of the prior art and amines and/or alcohols, detailed descriptions of these processes herein is unnecessary. In order to apply the prior art processes to the carboxylic derivative compositions of this invention, all that is necessary is that reaction conditions, ratio of reactants, and the like as described in the prior art, be applied to the novel carboxylic derivative compositions of this invention. U.S. Pat. No. 4,234,435 is incorporated herein by reference for disclosure of post-treating dispersants formed from the reactions of the low chlorine carboxylic acylating agents of the invention with amines, alcohols and metallic compositions as described hereinabove.

EXAMPLE 3

About 1300 grams (1.71 equivalents) polyisobutylene carboxylic acylating agent synthesized as in Examples 1 and 2 above having a succination ratio of about 1.5 and a nominal molecular weight of 2200 and a chlorine content of about 1200 ppm is mixed with 1383 grams of 100 neutral mineral oil and heated to 99° C. To this heated mixture is charged 100 grams (2.4 equivalent) of polyethyleneamine bottoms (Union Carbide as HPA-X) and the mixture was heated to 100° C.–116° C. over 2 hours. The temperature was then increased to 149° C. over 3 hours while using a subline nitrogen purge and held at 149° C. for 1 hour while removing distillate. The mixture was filtered at 138° C. through diatomaceous earth to yield a product having TBN (Total Base Number) of about 27.5.

It will be recognized that the substituted carboxylic acylating agents formed by reacting polyolefins and maleic anhydride have residual polyolefin. The polyolefin in the acylating agent is roughly in the range of 5–25% by weight of the product depending on the method of synthesis. The reaction of polyolefins with (B) the carboxylic reactants takes place simultaneously with the polyolefin substituted succinic anhydride.

Those skilled in the art will realize that the low chlorine polyisobutylene substituted carboxylic acylating agents and their further reaction products with (a)–(d) above are novel and useful in fuels and lubricants. For use in fuels, the low chlorine content compositions and dispersant derivatives thereof are mixed in any fuel as is known to those skilled in the art at a level of about 5–15,000 parts per million. The low chlorine carboxylic acylating agents and dispersants formed therefrom are normally dissolved in a fluidizer to make a concentrate at the level of about 5–95% by weight chemical. The fluidizers used are diluent oils and inert stable oleophilic organic solvents boiling in the range of about 150° C. to 400° C. Preferably, for use in fuels an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the amount of the additive will be ordinarily at least 5 percent by weight and generally not exceed 70 percent by weight, preferably from 5 to 50 and more preferably from 1 0 to 25 weight percent.

The diluent oils suitable for fluidizers are mineral or synthetic oils having kinematic 100° C. viscosity values of about 20 cSt to about 25 cSt. Synthetic oils include but are not limited to polyoxyalkylene mono and polyols, either derivatives thereof and N-vinylpyrrolidinone addition products thereof, polyalpha olefins and hydrogenated polyalphaolefins.

The low chlorine carboxylic reaction products and their further reaction products with (a)–(d) described hereinabove, and especially amine and polyamine derivatives are mainly utilized in oils of lubricating viscosity at levels of 0.1–20 weight percent on a chemical basis. The oils are well known to those familiar with the art and may be mineral, plant and synthetic oils or mixtures thereof. The carboxylic acylating agents ) and their further reaction products may be made up in concentrates having 5–95% on a weight basis in diluent oil. The concentrates may then be added to a selected oil of lubricating viscosity.

What is claimed is:

1. A method for making polyolefin-substituted carboxylic acylating agents having reduce chlorine content, said method comprising the steps of:

A. forming and heating at a temperature less than about 150° C. a mixture comprising a conventional polyolefin having $M_n$ 300–10,000 and about 90 mole percent, based on the moles of said polyolefin, of tetra- and trisubstituted end groups, and a halogen, said halogen being added to said mixture in a molar amount up to about an amount equal to said moles of end groups;

B. adding to said mixture an α-β unsaturated acid or an α-β unsaturated anhydride compound sequentially to or simultaneously with addition of said halogen;

C. increasing the temperature of said mixture from about 170° C. to about 220° C. and holding the mixture at said temperature for a time sufficient to react said polyolefin with said α-β unsaturated acid or said α-β unsaturated anhydride compound;

D. cooling said mixture to less than about 200° C. and adding thereto about equal molar amounts of said halogen and said α-β unsaturated acid or said α-β unsaturated anhydride compound; and E. increasing the temperature of said mixture to a limit of less than about 220° C. and holding at said temperature for a time sufficient to reduce unreacted α-β unsaturated acid or α-β unsaturated anhydride compound in said mixture to less than about three percent, wherein said method produces a polyolefin substituted carboxylic acylating agent having a chlorine content of less than about 2,000 parts per million.

2. The method according to claim 1, wherein said α-β unsaturated compound added in step B is less than about 1.5 mole per mole of polyolefin.

3. The method according to claim 1, wherein said heating of step A is conducted at a temperature of about 50° C.–150° C.

4. The method according to claim 1, wherein said mixture of step A further comprises an α-β unsaturated acid or an α-β unsaturated anhydride compound.

5. The method according to claim 1, wherein said mixture of step A further comprises hexane or other substantially chlorine inert liquid as a solvent.

6. The method according to claim 1, wherein said polyolefin is polyisobutylene having $\overline{M}_n$ of about 500–2,500.

7. The method according to claim 1, wherein said reaction is carried out using a dilution gas.

8. The method according to claim 7, wherein said dilution gas is $N_2O$ or $CO_2$ or $N_2$.

9. The method according to claim 1, wherein said halogen content of said carboxylic acylating agent is about 1,000 parts per million or less.

10. The method according to claim 1, wherein said mixture of step E is purged with $N_2$ gas.

11. A method according to claim 1, said method further comprising the step of

F. reacting said polyolefin substituted carboxylic acylating agent having less than 2,000 parts per million chlorine with a reactant selected from the group consisting of (a) an amine characterized by the presence within its structure of at least one H—N< group, (b) an alcohol, (c) a reactive metal or reactive metal compound, and (d) a combination of two or more of any (a) through (c); the components of (d) being reacted with said reaction products sequentially or simultaneously in any order, said reactants additionally including ammonia and hydrazine.

12. A minor amount of the composition formed according to claims 1 or 11 dissolved in a majority of a fuel.

13. A minor amount of the composition formed according to claims 1 or 11 dissolved in a majority of an oil of lubricating viscosity.

14. A composition of matter comprising a polyolefin substituted carboxylic acylating agent having reduce chlorine content, said composition being formed by the steps of:

A. forming and heating at a temperature less than about 150° C. a mixture comprising a conventional polyolefin having $M_n$ 300–10,000 and about 90 mole percent, based on the moles of said polyolefin, of tetra- and trisubstituted end groups, and a halogen, said halogen being added to said mixture in a molar amount up to about an amount equal to said moles of end groups;

B. adding to said mixture an α-β unsaturated acid or an α-β unsaturated anhydride compound sequentially to or simultaneously with addition of said halogen;

C. increasing the temperature of said mixture to a limit of less than about 220° C. and holding the mixture at said temperature for a time sufficient to react said vinylidene end groups of said polyolefin with said α-β unsaturated acid or said α-β unsaturated anhydride compound;

D. cooling said mixture to less than about 200° C. and adding thereto about equal molar amounts of said halogen and said α-β unsaturated acid or said α-β unsaturated anhydride compound; and E. increasing the temperature of said mixture to a limit of less than about 220° C. and holding at said temperature for a time sufficient to reduce unreacted α-β unsaturated acid or α-β unsaturated anhydride compound in said mixture to less than about one percent, wherein a polyolefin substituted carboxylic acylating agent having a chlorine content of less than about 2,000 parts per million is produced.

15. A composition of matter according to claim 14, wherein said carboxylic acylating agent having a chlorine content of less than about 2,000 parts per million is reacted with a reactant selected from the group consisting of (a) an amine characterized by the presence within its structure of at least one H—N< group, (b) an alcohol, (c) a reactive metal or reactive metal compound, and (d) a combination of two or more of any (a) through (c); the components of (d) being reacted with reaction products simultaneously or sequentially in any order, said reactants additionally including ammonia and hydrazine.

16. Minor amounts of the composition of claim 14 or 15 dissolved in a majority of a fuel.

17. Minor amounts of the composition of claim 14 or 15 dissolved in a majority of an oil of lubricating viscosity.

* * * * *